US009710302B2

United States Patent
Bates et al.

(10) Patent No.: US 9,710,302 B2
(45) Date of Patent: Jul. 18, 2017

(54) DYNAMIC TIMEOUT PERIOD ADJUSTMENT OF SERVICE REQUESTS

(71) Applicant: International Business Machines Corporation, Armonk, NY (US)

(72) Inventors: Andrew P. Bates, Winchester (GB); Fraser P. Bohm, Salisbury (GB); Pradeep Gohil, Hursley (GB); Anthony P. Papageorgiou, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 14/950,311

(22) Filed: Nov. 24, 2015

(65) Prior Publication Data

US 2017/0147394 A1 May 25, 2017

(51) Int. Cl.
*G06F 9/48* (2006.01)

(52) U.S. Cl.
CPC .......... *G06F 9/485* (2013.01); *G06F 9/4887* (2013.01)

(58) Field of Classification Search
CPC ...................................... G06F 9/485
See application file for complete search history.

(56) References Cited

U.S. PATENT DOCUMENTS

| | | | |
|---|---|---|---|
| 5,758,184 A * | 5/1998 | Lucovsky | G06F 9/546 710/6 |
| 6,363,496 B1 | 3/2002 | Kwiat | |
| 6,526,433 B1 * | 2/2003 | Chang | G06F 11/0709 709/201 |
| 7,493,394 B2 * | 2/2009 | Zavalkovsky | H04L 67/00 709/223 |
| 7,953,870 B1 | 5/2011 | Reeves et al. | |
| 8,089,886 B1 * | 1/2012 | Rahman | H04L 41/0622 370/242 |
| 8,214,492 B2 * | 7/2012 | Chauvin | H04L 12/2639 370/252 |
| 8,396,961 B2 * | 3/2013 | Little | G06F 9/466 709/201 |
| 8,966,487 B1 * | 2/2015 | Leonard | G06F 9/54 718/101 |

(Continued)

OTHER PUBLICATIONS

Kumar, Vijay, et al. "Tcot-a timeout-based mobile transaction commitment protocol." IEEE Transactions on Computers 51.10 (2002): 1212-1218.*

(Continued)

*Primary Examiner* — Charlie Sun
(74) *Attorney, Agent, or Firm* — Robert C. Bunker

(57) ABSTRACT

According to one exemplary embodiment, a method for dynamically timing out a first process within a plurality of suspended processes is provided. The method may include determining that a second process is attempting to suspend. The method may also include determining if a number of suspended processes plus one is less than a threshold value. The method may then include selecting the first process within the plurality of suspended processes to prematurely time out based on determining that the number of suspended processes plus one is not less than the threshold value. The method may further include timing out the selected first process. The method may also include suspending the second process.

9 Claims, 7 Drawing Sheets

(56) References Cited

U.S. PATENT DOCUMENTS

2008/0062863 A1* 3/2008 Ginde .................. H04L 12/66
　　　　　　　　　　　　　　　　　　　　　　　370/221

OTHER PUBLICATIONS

Carter, Richard, and Ludmila Cherkasova. "Detecting timed-out client requests for avoiding livelock and improving web server performance." Computers and Communications, 2000. Proceedings. ISCC 2000. Fifth IEEE Symposium on. IEEE, 2000.*
IBM, "List of IBM Patents or Patent Applications Treated as Related (Appendix P)," Oct. 4, 2016, p. 1-2.
Bates et al., "Dynamic Timeout Period Adjustment of Service Requests," Application and Drawings, Filed Apr. 27, 2016, 32 Pages, U.S. Appl. No. 15/139,400.
Carter et al., "Detecting Timed-Out Client Requests for Avoiding Livelock and Improving Web Server Performance," HP Labs Technical Report, Oct. 1999, p. 1-41, Hewlett-Packard Company.
Kumar et al., "TCOT—A Timeout-Based Mobile Transaction Commitment Protocol," IEEE Transactions on Computers, Oct. 2002, p. 1212-1218, vol. 51, No. 10.
Mell et al., "The NIST Definition of Cloud Computing," National Institute of Standards and Technology, Sep. 2011, p. 1-3, Special Publication 800-145.
Rong et al., "Determining the Optimal Timeout Values for a Power-Managed System based on the Theory of Markovian Processes: Offline and Online Algorithms," Design, Automation and Test in Europe Proceedings (Date '06), Mar. 6-10, 2006, 6 Pages, vol. 1.

* cited by examiner

DYNAMIC TIMEOUT PERIOD ADJUSTMENT OF SERVICE REQUESTS

BACKGROUND

The present invention relates generally to the field of computing, and more particularly, to service processing and management.

While servicing requests, a server may have to call out to additional external services. Additional external services may be used more ubiquitously since demand has risen for smarter applications that make decisions based on a broader set of contextual information available from other systems and from the rise of micro-service architectures.

SUMMARY

According to one exemplary embodiment, a method for dynamically timing out a first process within a plurality of suspended processes is provided. The method may include determining that a second process is attempting to suspend. The method may also include determining if a number of suspended processes plus one is less than a threshold value. The method may then include selecting the first process within the plurality of suspended processes to prematurely time out based on determining that the number of suspended processes plus one is not less than the threshold value. The method may further include timing out the selected first process. The method may also include suspending the second process.

According to another exemplary embodiment, a computer system for dynamically timing out a first process within a plurality of suspended processes is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may also include determining if a number of suspended processes plus one is less than a threshold value. The method may then include selecting the first process within the plurality of suspended processes to prematurely time out based on determining that the number of suspended processes plus one is not less than the threshold value. The method may further include timing out the selected first process. The method may also include suspending the second process.

According to yet another exemplary embodiment, a computer program product for dynamically timing out a first process within a plurality of suspended processes is provided. The computer program product may include one or more computer-readable storage devices and program instructions stored on at least one of the one or more tangible storage devices, the program instructions executable by a processor. The computer program product may include program instructions to determine that a second process is attempting to suspend. The computer program product may also include program instructions to determine if a number of suspended processes plus one is less than a threshold value. The computer program product may then include program instructions to select the first process within the plurality of suspended processes to prematurely time out based on determining that the number of suspended processes plus one is not less than the threshold value. The computer program product may further include program instructions to time out the selected first process. The computer program product may also include program instructions to suspend the second process.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
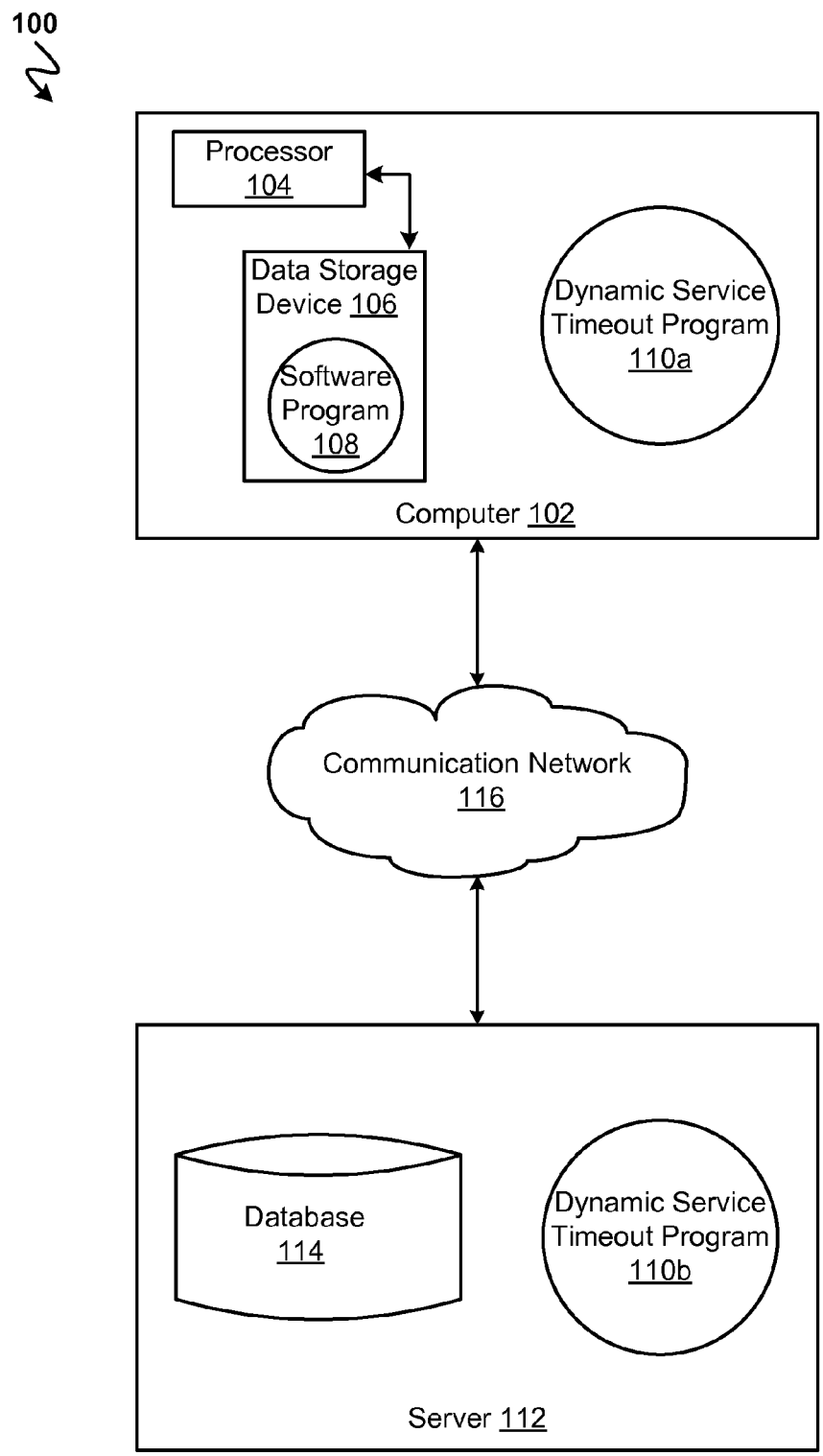
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for dynamic adjustment of timeout periods for service requests to maintain server throughput. As such, the present embodiment has the capacity to improve the technical field of service processing and management by adding a maximum waiting threshold and when the number of waiting processes meets the maximum waiting threshold, any new process that attempts to suspend may trigger a response that may select a currently waiting process and time out the selected process early before allowing another process to suspend, thus maintaining the maximum waiting processes under the threshold.

As described previously, while servicing requests, a server may have to call out to additional external services. Additional external services may be used more ubiquitously since demand has risen for smarter applications that make decisions based on a broader set of contextual information available from other systems and from the rise of microservice architectures.

To stop requests to external services from waiting indefinitely, if the service becomes unresponsive, a timeout is traditionally set on the call (or for all calls in the system) that denotes the maximum amount of time to wait for a call to complete. In the case when a server calls to an external service and the server is waiting for a response longer than the predefined amount of time specified for the timeout, the server may stop waiting and return a timed out error condition to the calling process notifying the process of the timeout condition.

Timeouts may stop processes from waiting an indefinite amount of time for external service calls that may otherwise clog up the system. However, for a system interested in maintaining a level of throughput of requests served, timeouts are nearly impossible to set correctly since a correct timeout value for one situation may be wrong for another situation when the dynamics of the workload and behavior may have changed.

For example, a server may serve requests that take an average of 1.0 second to process from end-to-end and may be limited to 1000 concurrent requests. Half of the 1.0 second response time may be taken up by a call to an external service. Under normal circumstances, the external service call may respond with an average response time of 0.5 seconds, however, each call to the service may vary between 0.1 seconds and 3.0 seconds. The timeout for the service call may be set to 3.0 seconds since requests may occasionally take that long and it may be preferable to avoid timing out a valid request prematurely. Furthermore, a requirement may be set to be able to handle a peak throughput Service Level Agreement (SLA) of 500 requests per second.

Under normal conditions, the server may serve 1000 requests in parallel at an average response time of 1.0 second per request and thus have a maximum throughput of 1000 requests per second. Since this is much higher than the 500 requests per second of the SLA, the server is able to handle current loads with the timeout set to 3.0 seconds.

If the external service's average response time increases to 1.5 seconds, the server's total response time increases to 2.0 seconds per request (i.e., 1.5 seconds for external and 0.5 for internal latencies). The maximum throughput would then lower to 500 requests per second which matches the SLA, thus the server is still keeping up with the SLA.

If the external service provider becomes slower, for instance due to maintenance, average response time may increase to 2.5 seconds per request with some requests taking up to 4.0 seconds. At an average rate of 3.0 seconds per request, the server's maximum throughput may be reduced to 333 requests per second. This would result in the server failing to meet the SLA. If the current workload is low (i.e., 200 requests per second) the server may still meet the SLA. Since some good external service requests may take more than 3.0 seconds to respond, these external service requests will be timed out unnecessarily since the server still has resources available to wait longer (e.g., 4.0 seconds) in order to avoid timing out requests.

However, if the external service provider continues to run slowly with the server's maximum throughput still at 333 requests per second, and the workload increases from 200 requests per second to 500 requests per second, the server may queue inbound requests at a rate of 167 requests per second. As the server runs out of storage space (due to the growing queue), the server may become crippled and stop responding. In this case, a lower timeout value, such as 1.0 seconds, may have helped to abandon the longest of the external service requests, maintain throughput, and still service some of the incoming requests.

Thus, whatever fixed value is chosen for timing out requests, there may be situations when it is either too low or too high for the current workload. If the timeout value selected is too low, requests may be timed out that could have completed successfully. If the timeout value selected is too high, the result may impact throughput, queue up requests, take down servers, and miss SLAs.

Therefore, it may be advantageous to, among other things, provide a way to dynamically adjust timeout periods of service requests to maintain server throughput by choosing waiting processes to time out early based on selection criteria when the number of waiting processes exceeds a threshold value.

According to at least one embodiment, a maximum waiting threshold value may be used to denote the maximum number of processes in the server that are allowed to be waiting for a response from an external service at one time. The maximum waiting threshold may be less than the maximum number of concurrent processes allowed in the server at one time (e.g., due to memory limitations or other resource limitations) and may be derived from the maximum number of concurrent processes allowed in the server (e.g., MaxWaiting may equal 75% of MaxProcesses). In virtual environments, the maximum waiting threshold may be based on the amount of resources allocated to the virtual machine.

If the number of waiting processes is less than max waiting, then timeouts may proceed to function according to their default behavior. If a new process wants to suspend (i.e., start waiting for an external service) which would make the waiting processes exceed the maximum waiting threshold, then one of the currently waiting processes may be selected and timed out early. The currently waiting process selected for early timeout may be selected based on the process closest (proportionately) to timing out naturally. Thus, the system may time out more aggressively when the system needs to keep up with current workload demands.

According to at least one other embodiment, the system may optionally ignore timeouts altogether and just wait as long as required for a response, using timeouts only as an aid to select which process to time out prematurely in the event that MaxWaiting is reached.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a dynamic service timeout program 110a. The networked computer environment 100 may also include a server 112 that is enabled to run a dynamic service timeout program 110b that may interact with a database 114 and a communication network 116. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the dynamic service timeout program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the dynamic service timeout program 110a, 110b (respectively) to maintain server throughput by limiting the amount of processes that may wait for an external service by selecting and prematurely timing out a currently waiting process if a new process attempts to suspend when the maximum number of waiting processes meets a threshold value. The dynamic service timeout method is explained in more detail below with respect to FIG. 2.

Figure 2:
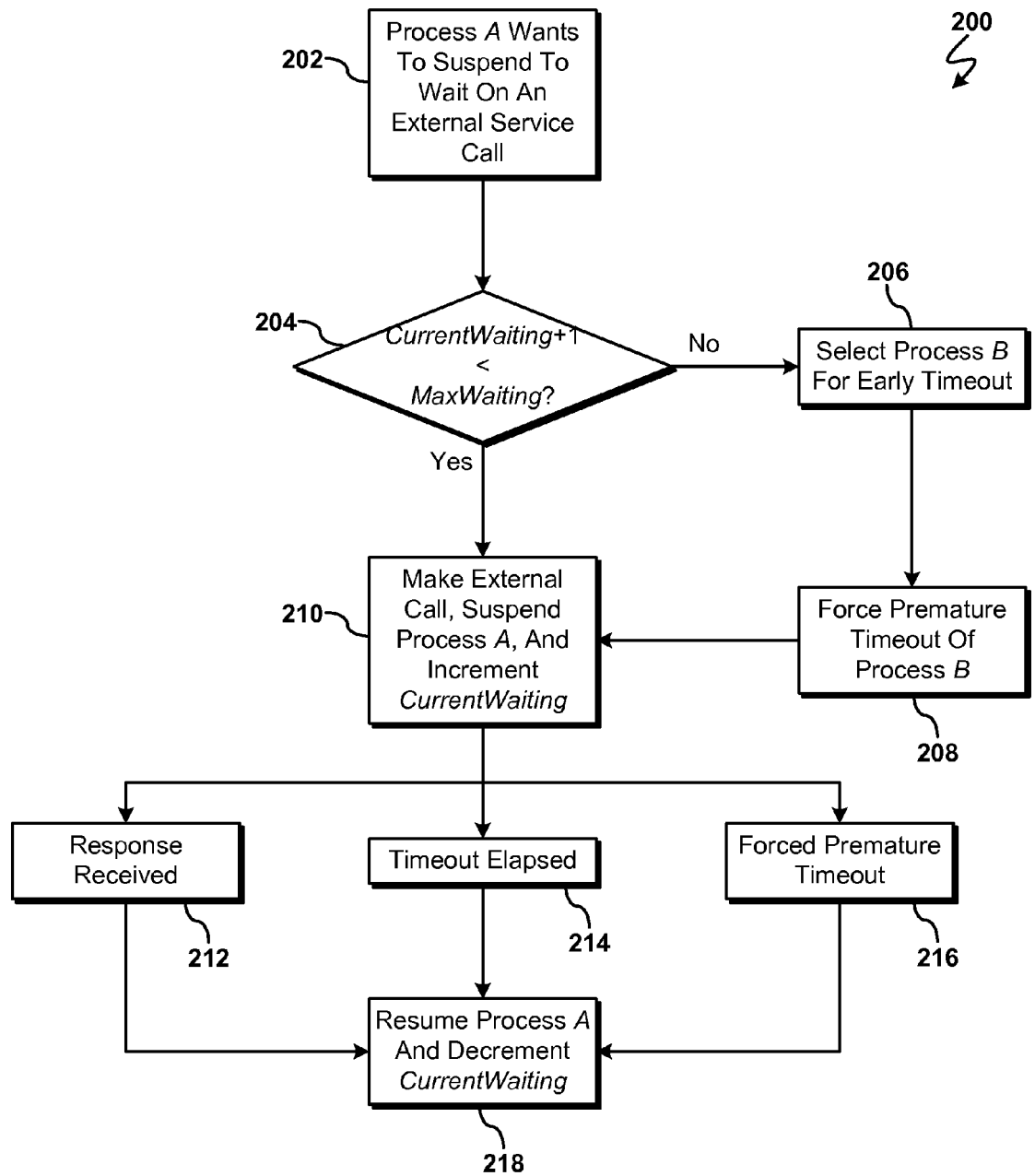
FIG. 2 is an operational flow chart illustrating a process for dynamic timeout period adjustment according to at least one embodiment.

Referring now to FIG. 2, an operational flow chart illustrating the exemplary process 200 by the dynamic service timeout program 110a and 110b (FIG. 1) according to at least one embodiment is depicted.

At 202, process (i.e., service) A wants to suspend execution to wait for an external service call to complete. According to at least one embodiment, a process being executed by a computer (e.g., a server such as server 112 (FIG. 1)) may need to perform an external service call in the course of executing on the computer. The process may not be able to continue execution until a response is received from the external service, thus the process may attempt to suspend execution until the external service call completes.

For example, a banking program executing on a server (e.g., 112 (FIG. 1)) may need to query stock prices in the course of execution. Process P associated with the banking program, such as a process calculating the total investments of a customer, may have code that queries stock prices. The query for stock prices may be an external service call that travels over a communications network (e.g., 116 (FIG. 1)) to a remote computer (e.g., 102 (FIG. 1)) that may determine stock prices and return the result over the communications network (e.g., 116 (FIG. 1)) to the process executing on the server (e.g., 112 (FIG. 1)). Since process P may not be able to continue execution until the external service call completes and the requested stock prices are returned, process P may attempt to suspend until a response is received.

Next, at 204, it is determined if adding the process wanting to suspend to the current number of suspended processes (i.e., as denoted by the value of variable CurrentWaiting+1) is less than a threshold value (i.e., as denoted by the value of MaxWaiting). According to at least one embodiment, the threshold value may be a predetermined value set to denote the maximum amount of processes that may be suspended at the same time. The threshold value may be set to be less than the maximum number of concurrent processes allowed (e.g., denoted by an integer MaxProcesses) at any one time and may be derived from the maximum number of concurrent processes allowed (e.g., MaxWaiting=75% of MaxProcesses). A comparison may be performed to determine if the value of CurrentWaiting would be less than the threshold value MaxWaiting if the process attempting to suspend at 202 is allowed to suspend.

For example, if the maximum number of concurrent processes allowed on server 112 (FIG. 1) is 25 (i.e., MaxProcesses=25), the threshold value is 75% of the MaxProcesses value (i.e., MaxWaiting is rounded to 19), and the current number of suspended processes (i.e., CurrentWaiting) is 17, then it would be determined that CurrentWaiting+1 (i.e., 17+1=18) is less than the threshold value MaxWaiting (i.e., 19).

According to at least one other embodiment, the MaxWaiting threshold value may be a dynamic value that may be automatically modified. A user may set a range within which the threshold value may be set (e.g., between 30% and 70% of MaxProcesses). Then, the dynamic service timeout program 110a and 110b (FIG. 1) may alter the threshold value based on measurable system conditions, such as inbound work rate. Raising the threshold value may have the effect of allowing more time for processes to complete successfully at the detriment of potential system throughput. Lowering the threshold value may time out processes more aggressively to maintain or increase throughput.

If it is determined that the process wanting to suspend added to the current number of suspended processes is not less than the threshold value at 204, then a process that is currently suspended (e.g., process B) may be selected for early timeout at 206. According to at least one embodiment, a dispatcher entity executing on an electronic device (e.g., server 112 (FIG. 1)) may track the currently suspended processes using a data structure, such as a list. The dispatcher may select a process from the list of suspended processes according to selection criteria for early timeout to allow the process that is attempting to suspend (i.e., at 202) to suspend while maintaining the MaxWaiting threshold.

According to at least one implementation, selection criteria may include selecting the process that is closest proportionally to reaching the process' timeout threshold. The dispatcher may query each task to determine how long each task has waited for a response. The result of the query to each task may be expressed as a percentage of the task's total timeout value and then the dispatcher may rank the returned queries by percentage of timeout value and select the task with the highest percentage as the candidate process to prematurely time out.

For example, for processes $P_1$ and $P_2$, $P_1$ has a timeout threshold of 1.0 seconds and $P_2$ has a timeout threshold of 2.0 seconds. If $P_1$ has been waiting for 0.5 seconds and $P_2$ has been waiting for 0.8 seconds, $P_1$ may be selected for early timeout even though $P_1$ has been waiting less time. $P_1$ may be selected since $P_1$ has been waiting for 50% of $P_1$'s timeout threshold whereas $P_2$ has only waited for 40% of $P_2$'s timeout threshold. Thus, simpler/shorter request may not be favored over more complex requests. Instead, requests exhibiting normal response times may be favored over requests exhibiting abnormal response times.

According to at least one other embodiment, the dispatcher may query each task and obtain a result expressed as the amount of actual time remaining until the external service call would time out naturally. For example, if a process has a 2.0 second timeout value, and has waited 0.4 seconds, the result of the dispatcher's query would be 1.6 seconds of actual time remaining.

It may be appreciated that other selection criteria may be employed to select a process for early timeout, such as criteria that favors high priority workloads over low priority workloads or favoring healthy applications over unhealthy applications, etc. Furthermore, selection criteria may include a combination of different criteria or may dynamically switch between different selection criteria based on working conditions.

Then, at 208, the selected process B is forced to prematurely timeout. According to at least one embodiment, the dispatcher, or other entity tasked with handling processes, may prematurely time out the process selected previously at 206. The dispatcher may have a "Force Premature Timeout" event added that may cause a suspended process to resume as if the process' external service call had timed out. Thus, the previously selected process (i.e., at 206) that was suspended, may resume in response the "Force Premature Timeout" event. As will be discussed below, once a process is forced to prematurely time out, the CurrentWaiting counter may be decremented to accurately reflect the number of processes currently waiting.

For example, the current suspended processes in server 112 (FIG. 1) may include processes $P_1$, $P_2$, and $P_3$. If process $P_2$ was selected previously to be prematurely timed out at 206, the dispatcher may invoke a "Force Premature Timeout" event for process $P_2$. Thereafter, process $P_2$ may resume. The current suspended processes in server 112 (FIG. 1) may then be processes $P_1$ and $P_3$.

If it is determined that the process wanting to suspend (i.e., process A) added to the current number of suspended processes is less than the threshold value at 204, or if process B was prematurely timed out at 208, then the external call requested by process A is made, process A is suspended, and the CurrentWaiting variable is incremented at 210. According to at least one embodiment, the external service call originating from process A may be made, the dispatcher may suspend process A and the dispatcher may also add process A to the list of waiting processes. Since one more process has been added to the list of suspended processes, the variable CurrentWaiting may also be incremented to reflect the current total of suspended processes awaiting responses from external service calls.

Continuing the above example, if process $P_4$ wants to make an external service call to another computer 102 (FIG. 1) and suspend, the dispatcher in server 112 (FIG. 1) may make the external service call and suspend process $P_4$. Process $P_4$ may then be added to the list of waiting processes with processes $P_1$ and $P_3$. Thus, the list of waiting processes would become $P_1$, $P_3$, and $P_4$. The CurrentWaiting variable may then be incremented from 2 to 3 to reflect that there are three waiting processes.

At 212, a response to process A's external service call is received. According to at least one embodiment, once the external computer (e.g., 102 (FIG. 1)) receives and processes the external service request, the computer processing the external service request may send a response back to the electronic device (e.g., server 112 (FIG. 1)) handling process A. An entity, such as a response handler, may determine if a response was received and notify the dispatcher.

At 214, it is determined if a timeout condition has elapsed for process A's external service call. According to at least one embodiment, the dispatcher may determine, using known methods, when the time elapsed since the external service call was made exceeds the predetermined timeout value.

At 216, it is determined if a premature timeout is being forced on process A. According to at least one embodiment, the dispatcher may prematurely timeout process A using the "Force Premature Timeout" event described above previously.

Then, at 218, process A is resumed and the CurrentWaiting variable is decremented when either a response is received at 212, a timeout has elapsed at 214, or a premature timeout was forced at 216. According to at least one embodiment, the dispatcher may resume process A and decrement the CurrentWaiting variable to accurately reflect that the number of currently waiting processes has decreased by one since process A has resumed.

Referring now to FIGS. 3A-3D, block diagrams illustrating a process list 300 in various process handling scenarios are depicted.

Figure 3A:
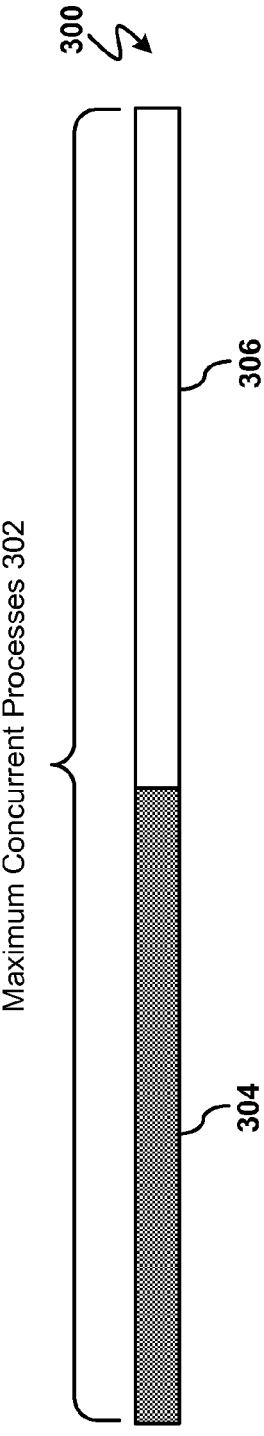
FIG. 3A-3D are examples of concurrent process handling scenarios according to at least one embodiment.

FIG. 3A is a block diagram of the process list 300 showing the maximum concurrent processes 302 that may be allowed on the server (e.g., 112 (FIG. 1)) handling the processes with some capacity used for running processes 304. Out of the maximum concurrent processes 302 allowed, some running processes 304 are executing and the unused capacity 306 accounts for the remainder of the maximum concurrent processes 302 allowed.

Figure 3B:
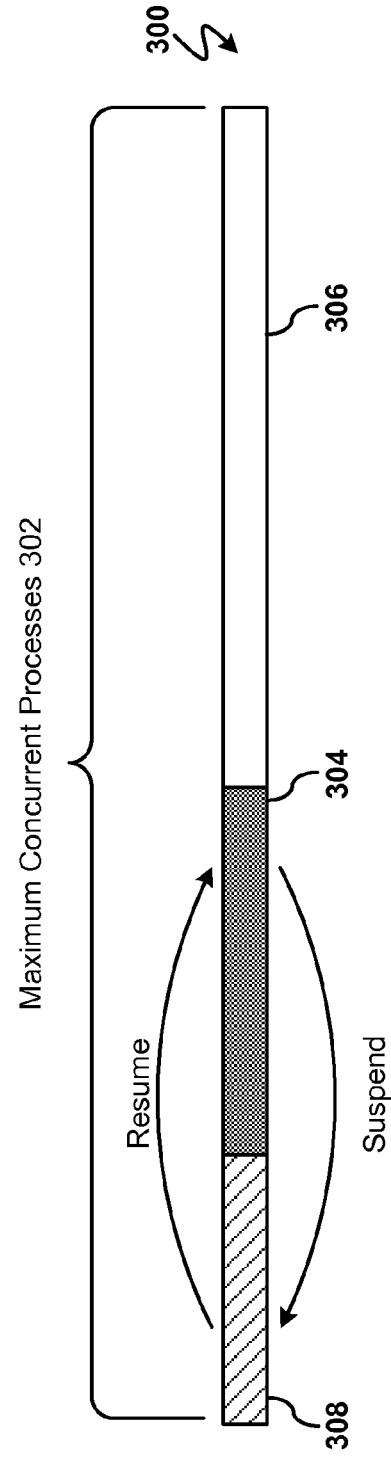

FIG. 3B is a block diagram of the process list 300 showing processes transitioning from a waiting state to a working state under normal conditions. Processes in the list of processes 300 transition from running process 304 to suspended processes 308 and vice versa. The combined total of running processes 304 and suspended processes 308 are less than the maximum concurrent processes 302 allowed, thus leaving unused capacity 306.

Figure 3C:
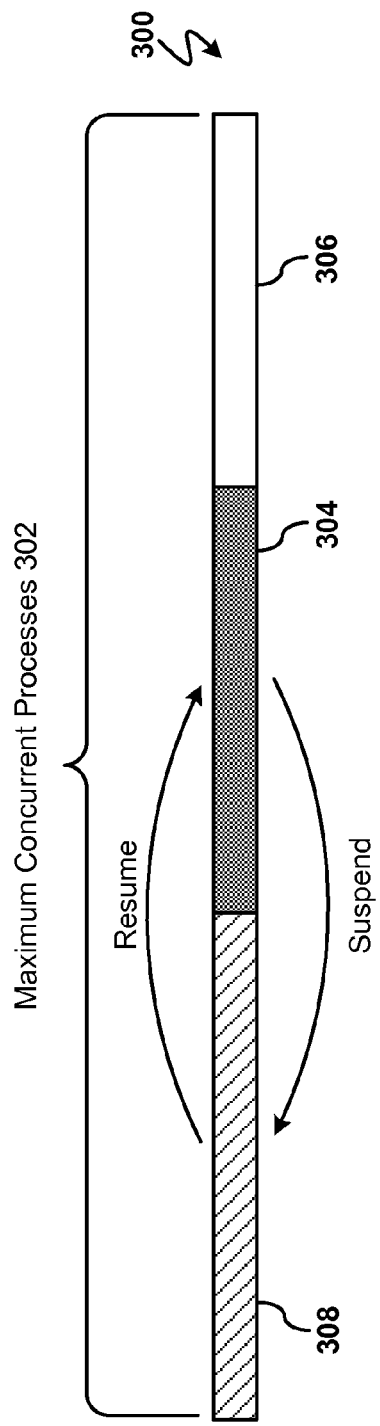

FIG. 3C is a block diagram of the process list 300 showing processes transitioning from a waiting state to a working state under increased load conditions. A greater number of processes in the list of processes 300 transition from running process 304 to suspended processes 308 due to increased external service request response times. The combined total of the running processes 304 and additional suspended processes 308 are still less than the maximum concurrent processes 302 allowed leading to a reduced amount of unused capacity 306.

Figure 3D:
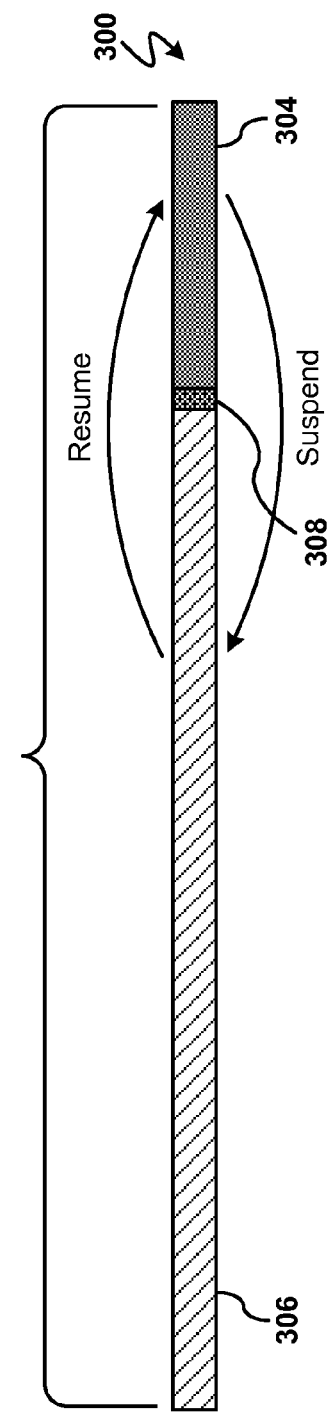

FIG. 3D is a block diagram of the process list 300 with a MaxWaiting threshold 308 according to at least one embodiment. As the number of suspended processes 306 increases, the MaxWaiting threshold 308 value caps the suspended processes 306 such that there may always be some of the maximum concurrent processes 302 resources available to execute running processes 304. As described previously with respect to FIG. 2, when suspended processes 306 increase and reach the MaxWaiting threshold 308, a process from running processes 304 that attempts to suspend may prompt the dispatcher to select a suspended process from the suspended processes 306 to prematurely time out in order to allow for one of the running processes 304 to suspend. Thus, the number of suspended processes 306 may remain below the MaxWaiting threshold 308 value.

Figure 4:
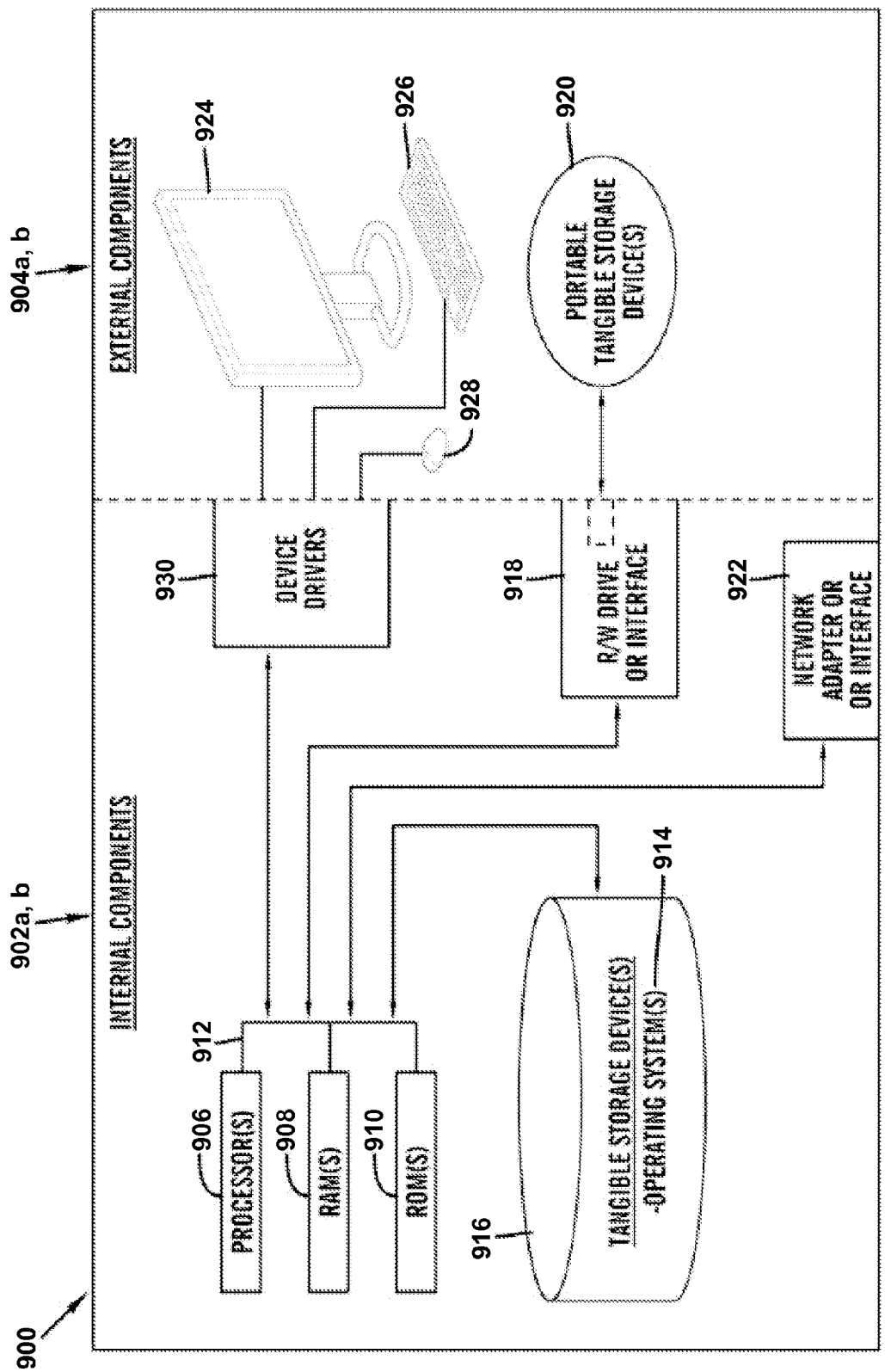
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 *a, b* and external components 904 *a, b* illustrated in FIG. 4. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the software program 108 (FIG. 1) and the dynamic service timeout program 110*a* (FIG. 1) in client computer 102 (FIG. 1) and the dynamic service timeout program 110*b* (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the dynamic service timeout program 110*a* and 110*b* (FIG. 1) can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the dynamic service timeout program 110*a* (FIG. 1) in client computer 102 (FIG. 1) and the dynamic service timeout program 110*b* (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the dynamic service timeout program 110*a* (FIG. 1) in client computer 102 (FIG. 1) and the dynamic service timeout program 110*b* (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices.

Each of the sets of internal components 902 *a, b* also includes device drivers 930 to interface to computer display monitor 924, keyboard 926, and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
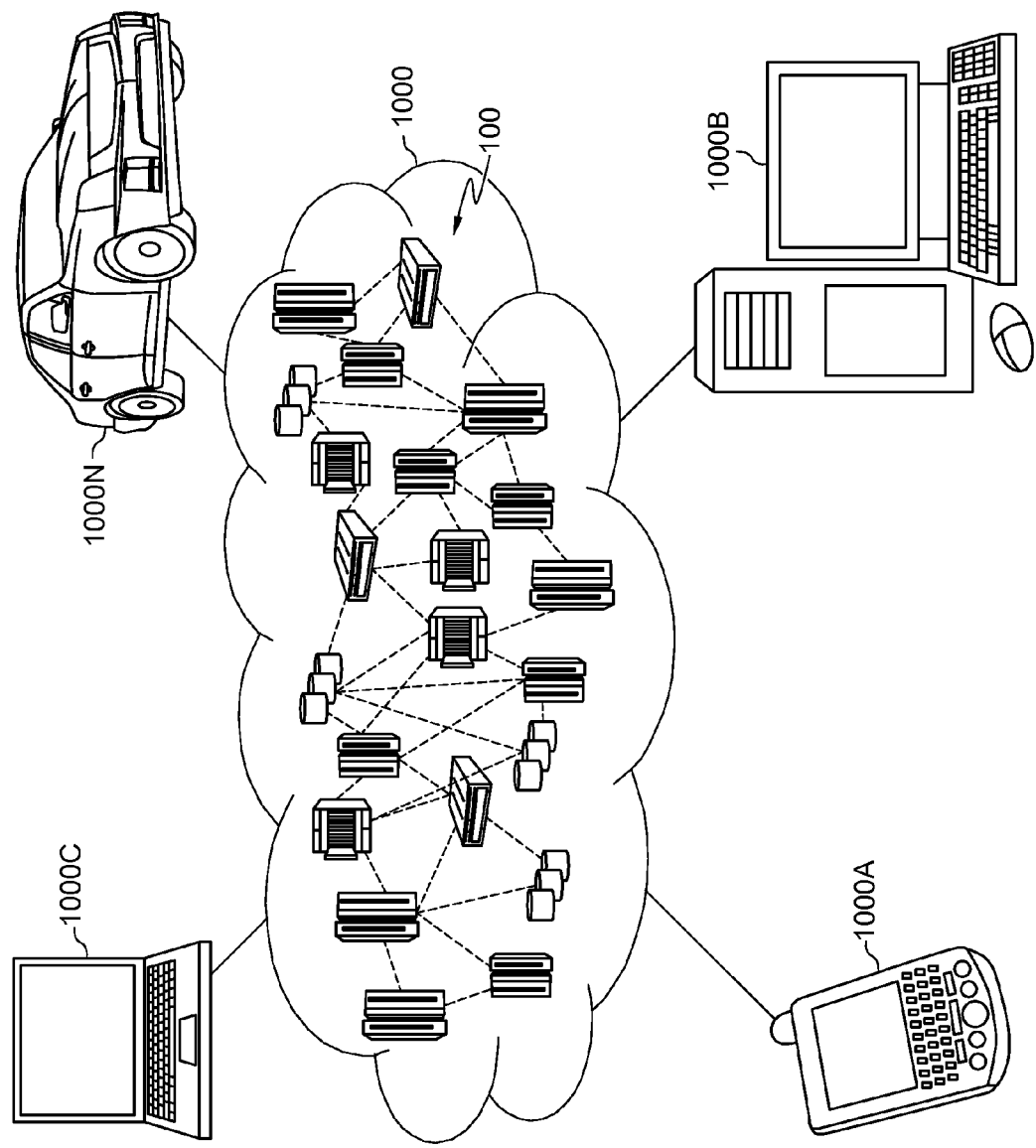
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
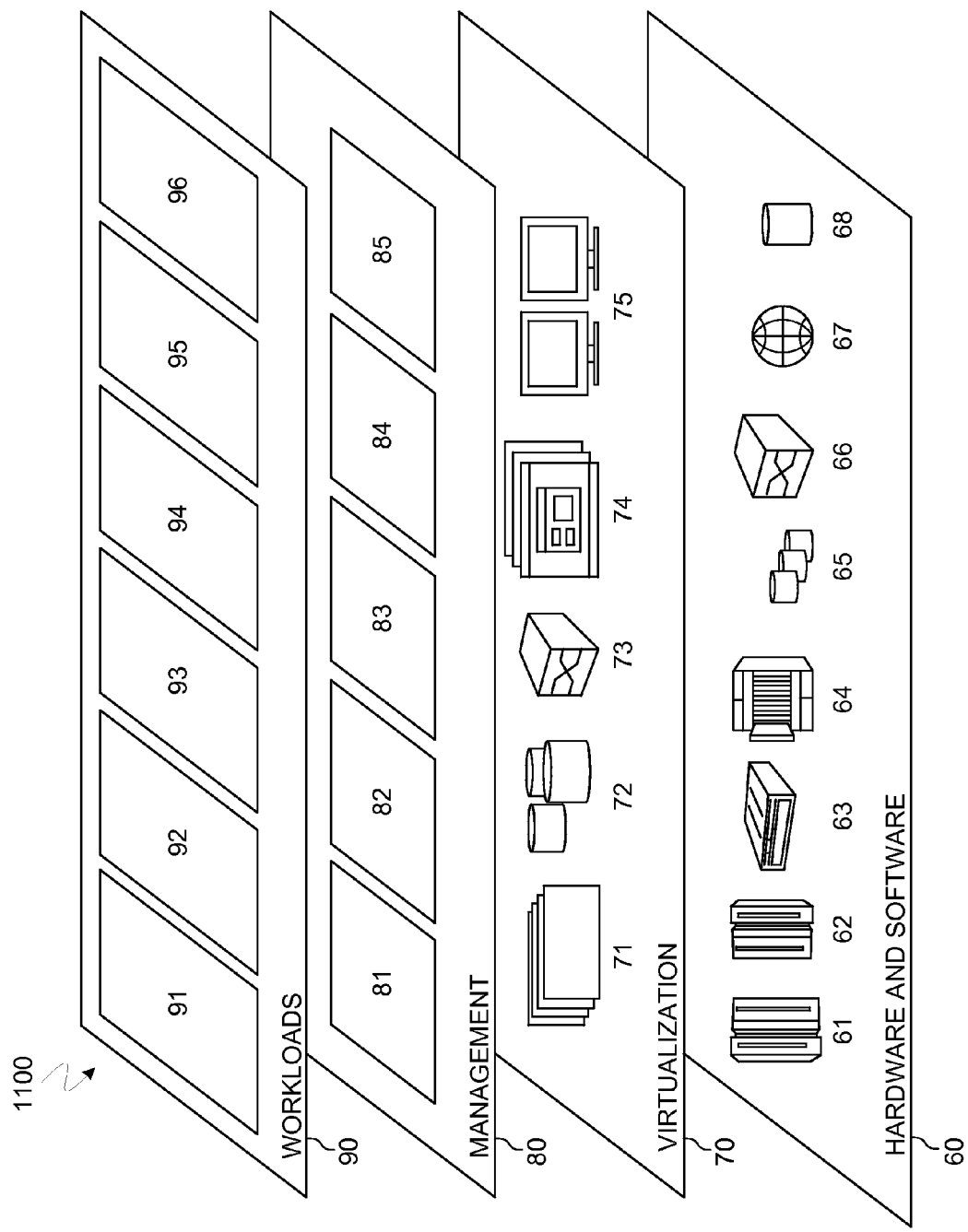
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic service timeout 96. A dynamic service timeout program 110a, 110b (FIG. 1) provides a way to maintain server throughput by limiting the amount of processes that may wait for an external service by selecting and prematurely timing out a currently waiting process if a new process attempts to suspend when the maximum number of waiting processes meets a threshold value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising a series of steps to dynamically time out a first process within a plurality of suspended processes running on a server computer to maintain throughput at the server computer by:
  determining that a second process running on the server computer is attempting to suspend;
  determining whether a number of the plurality of suspended processes plus one is less than a threshold value, wherein the threshold value includes a variable based on a maximum concurrent processes value;
  in response to the determining, if the number of the plurality of suspended processes plus one is not less than the threshold value, selecting the first process within the plurality of suspended processes to prematurely time out;
  timing out the selected first process;
  in response to the timing out the selected first process, incrementing the number of the plurality of suspended processes; and
  suspending the second process.

2. The computer system of claim 1, wherein the threshold value comprises a variable based on at least a value range, and at least one measurable system condition.

3. The computer system of claim 1, wherein selecting the first process within the plurality of suspended processes to prematurely time out comprises selecting a suspended process having a lowest actual time remaining to time out from the plurality of suspended processes as the first process.

4. The computer system of claim 1, wherein selecting the first process within the plurality of suspended processes to prematurely time out comprises selecting a suspended process having a lowest percentage of a total timeout time remaining from the plurality of suspended processes as the first process.

5. The computer system of claim 1, wherein selecting the first process within the plurality of suspended processes to prematurely time out comprises ordering the plurality of suspended processes based on a workload priority value associated with each suspended process within the plurality of suspended processes and selecting a lowest workload priority process from the plurality of suspended processes as the first process.

6. The computer system of claim 1, further comprising: removing the selected first process from the plurality of suspended processes; and adding the second process to the plurality of suspended processes.

7. A computer program product, comprising:
  one or more computer readable storage medium and program instructions stored on at least one of the one or more storage medium, the program instructions executable by a processor to dynamically time out a first process within a plurality of suspended processes running on a server computer to maintain throughput at the server computer, the program instructions comprising instructions to:
  determine that a second process running on the server computer is attempting to suspend;
  determine whether a number of the plurality of suspended processes plus one is less than a threshold value, wherein the threshold value includes a variable based on a maximum concurrent processes value;
  in response to the determining, if the number of the plurality of suspended processes plus one is not less than the threshold value, select the first process within the plurality of suspended processes to prematurely time out;
  time out the selected first process;
  in response to the timing out the selected first process, increment the number of the plurality of suspended processes; and
  suspend the second process.

8. The computer program product of claim 7, wherein the threshold value comprises a variable based on at least a value range, and at least one measurable system condition.

9. The computer program product of claim 7, wherein the instructions to select the first process within the plurality of suspended processes to prematurely time out comprises selecting a suspended process having a lowest actual time remaining to time out from the plurality of suspended processes as the first process.

* * * * *